Figure 3:
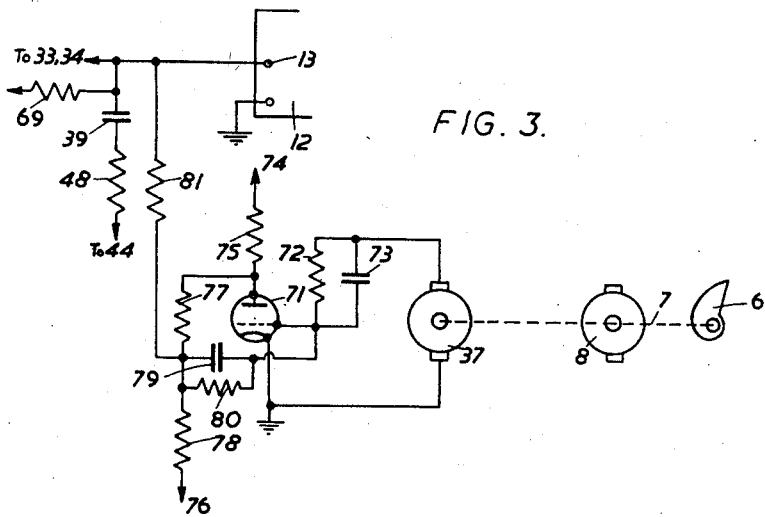

Dec. 16, 1952     E. L. C. WHITE     2,622,236
CONTROLLING THE PHASE OF APPARATUS FOR
GENERATING ELECTRICAL OSCILLATIONS
Filed March 25, 1949     2 SHEETS—SHEET 1
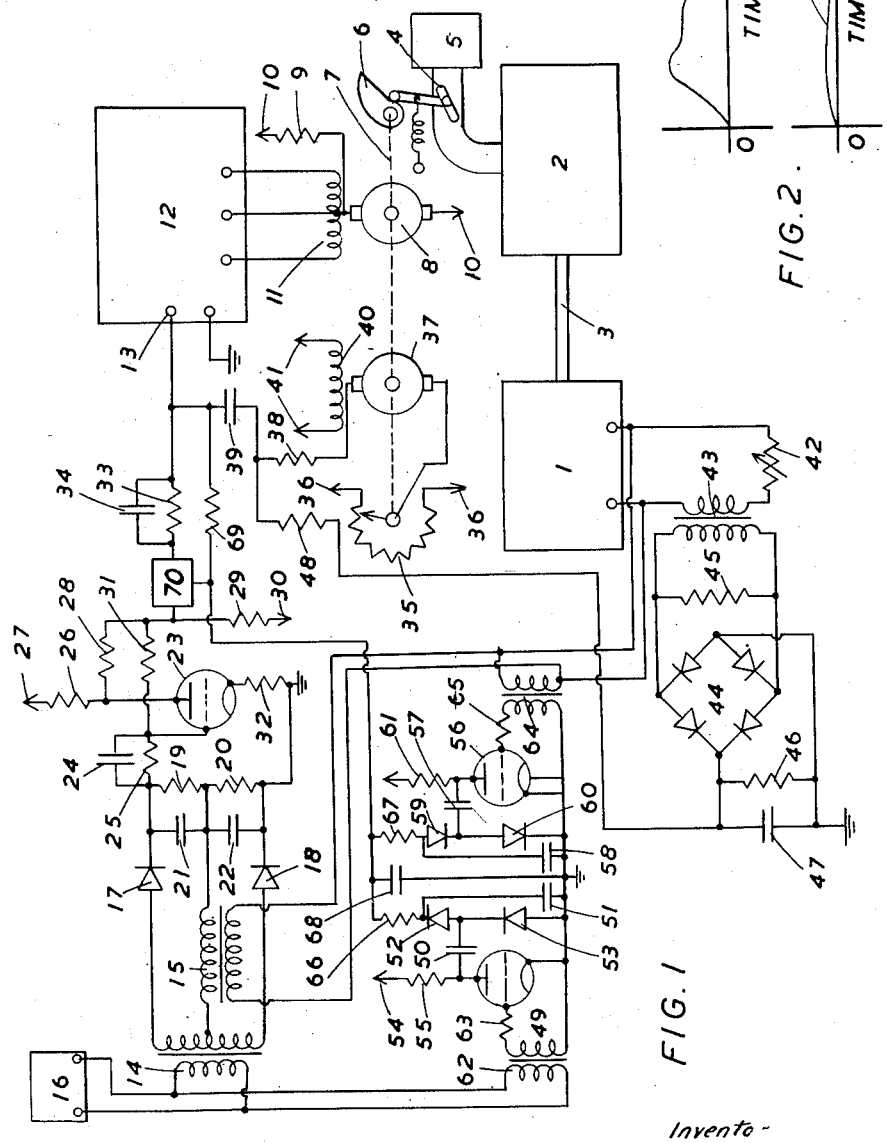
Inventor-
E. L. C. WHITE
By J. O. Ollier
Attorney Dec. 16, 1952   E. L. C. WHITE   2,622,236
CONTROLLING THE PHASE OF APPARATUS FOR
GENERATING ELECTRICAL OSCILLATIONS
Filed March 25, 1949   2 SHEETS—SHEET 2

Inventor
E. L. C. WHITE
By
J. O. Ollier
Attorney

Patented Dec. 16, 1952

2,622,236

UNITED STATES PATENT OFFICE 2,622,236

CONTROLLING THE PHASE OF APPARATUS FOR GENERATING ELECTRICAL OSCILLATIONS

Eric Lawrence Casling White, Iver, England, assignor to Electric & Musical Industries Limited, Hayes, Middlesex, England, a company of Great Britain Application March 25, 1949, Serial No. 83,318
In Great Britain April 1, 1948

13 Claims. (Cl. 322—19)

This invention relates to controlling the phase of electrical oscillation generators.

In a public television system it is desirable, for a variety of reasons, to synchronise the frame frequency of the system with the frequency of the public electricity supply and this can usually be achieved by effecting the necessary synchronism at the television transmitter. However, in the case of television transmitting equipment employed for so-called "outside" broadcasting this frequently involves controlling the phase of an alternating current generator, driven by a petrol engine, or other engine, from a lower power reference supply obtained from the public supply mains, because it is inconvenient or impossible to tap sufficient power from the supply mains to operate the equipment.

A known kind of arrangement for controlling the phase of generated electrical oscillations comprises means for generating a control potential which is a function (usually a sinusoidal function) of any deviation of the phase of the generated oscillations from a reference phase and means for utilising said control potential to vary the frequency and hence the phase of the generated oscillations so as to annul substantially the phase deviation. Usually the arrangement also comprises means whereby a component can be added to said control potential proportional to the rate of the phase deviation, this component serving to damp out oscillations which would otherwise be liable to occur in the variation of phase difference with time.

In the case of an alternating current generator driven by a petrol engine the control potential may be applied to cause an auxiliary motor to operate the throttle of the petrol engine. Difficulty is however experienced if the load on the generator is altered, for example by switching on other equipment or by a change in the mean brightness of the picture being transmitted, since in this case the petrol engine will accelerate or decelerate and the frequency of the generator will immediately start to vary and the generator will tend to seek a new equilibrium frequency if the throttle position is not changed. However, a change in the generator frequency also involves a phase change, as is well known, so that a control potential is set up which tends to counteract the frequency change of the generator by changing the throttle position. It is usual to amplify the control potential and utilise part of the amplified potential immediately to annul the acceleration or deceleration arising from the change in load and the whole of the amplified potential, after a time delay which is long compared with the hunting period of the arrangement, to restore effectively to zero such phase deviation as has been introduced by the momentary frequency change. However, even although the phase deviation is eventually restored nearly to zero, the arrangement is still not satisfactory on account of the fairly large transient phase shift of the generated oscillations which occurs. Such a transient phase shift may, for example, cause so-called "hum bars" to appear temporarily at television receivers, due to the television frames moving in phase with respect to the public electricity supply. Moreover, the maximum instantaneous load change that can be tolerated without causing the phase controlling arrangement to become inoperative is limited, if the control potential is a sinusoidal function of the phase difference, since the relationship between the control potential and the phase deviation is then approximately rectilinear only if the phase deviation is not more than $\pm 30°$.

Similar difficulties may arise with other apparatus for generating electrical oscillations and the object of the present invention is to reduce transient phase shifts which are liable to occur in the generated oscillations if the load on the apparatus is varied.

In accordance with the present invention there is provided an electrical oscillation generator having means for automatically controlling the phase of the generated oscillations so as to annul substantially phase deviations of the generated oscillations from a reference phase, and wherein means are provided for generating a control potential dependent upon variation of the load on said generator, and for utilising said control potential to vary the power supply to said generator so as to offset the load variation and reduce the phase deviation of the generated oscillations which would otherwise result.

In accordance with one form of the present invention there is provided an electrical oscillation generator having means for automatically controlling the phase of the generated oscillations, said means comprising control means capable, on the application of a potential thereto, of operating on the power supply to said generator so as to carry the phase of the generated oscillations, means for generating a control potential dependent upon deviation of the phase of the generated oscillations from a reference phase, and for applying said control potential to said control means to cause said control means to annul substantially the phase deviation, and wherein means are provided for generating a further control potential dependent upon variation of the load on said generator and for applying said further control potential to said control means to cause said control means to vary the power supply to offset the load variation, whereby the amplitude of the phase deviation of the generated oscillations caused by a variation of the load on said generator is less than would be the case in the absence of said further control potential.

In accordance with a preferred form of the present invention there is provided an electrical oscillation generator having means for automatically controlling the phase of the generated oscillations, said means comprising control means capable of operating on the power supply to said generator so as to vary the phase of the generated oscillations on application of a potential thereto, means for generating a control potential dependent upon deviation of the phase of the generated oscillations from a reference phase, means for applying said control potential to said control means so that part of said control potential is effective substantially instantaneously to cause said control means to arrest the phase deviation and so that the whole of said potential is subsequently effective to annul substantially the phase deviation, and wherein means are provided for generating a further control potential dependent upon variation of the load on said generator and for applying said further control potential to said control means so that it is effective substantially instantaneously to cause said control means to vary the power supply to said generator to offset the load variation, whereby the amplitude of the phase deviation of the generated oscillations caused by a variation of the load on said generator is less than would be the case in the absence of said further control potential.

In order that the said invention may be clearly understood and readily carried into effect, the same will now be more fully described with reference to the accompanying drawings, in which:

Figure 1 illustrates diagrammatically, and partly in block form, apparatus for generating alternating current according to one example of the invention, and Figure 2 illustrates graphs explanatory of the invention.

Reference will also be made to the accompanying drawing the single figure in which is, for convenience, numbered Figure 3, and illustrates a modification of the apparatus shown in Figure 1.

Referring to the drawings, reference numeral 1 indicates an alternating current generator of any suitable type driven by a petrol or other engine 2 via a shaft 3, the torque of the petrol engine being controllable in known manner by a spring-loaded throttle valve 4 in the fuel intake from the engine carburettor 5. The position of the throttle valve is controlled by a cam 6 which is coupled, via reduction gearing if necessary, to a shaft indicated by the dotted line 7 driven by an auxiliary electric motor 8, the cam being so shaped as to provide a linear relationship between the angular movement of the shaft 7 and the torque of the engine 2, i. e. the power supply to the generator 1. The armature of the motor 8 is excited via a resistance 9 from a steady D. C. source whose terminals are indicated at 10 while the field winding 11 is supplied from a high gain amplifier 12. The field of the motor is reversible, so that the shaft 7 can be rotated in either direction and while the amplifier may be of any convenient construction, the field winding 11 is shown centre tapped, on the assumption that the output of the amplifier 12 is taken from a push-pull pair of valves. The amplifier 12 may contain one or more further push-pull stages preceding and D. C. coupled to the output stage, and since the amplifier 12 has a high gain, it is convenient to regard the input point 13 as a so-called "virtual earth" point, the maximum voltage excursion being relatively small.

Part of the input current to the point 13 is obtained from a phase discriminator of known kind comprising two transformers 14 and 15, fed respectively from a source of reference oscillations 16 and from the generator 1, the transformers being connected to two rectifiers 17 and 18, the outputs from which are supplied to smoothing circuits comprising resistances 19 and 20 and condensers 21 and 22. The discriminator operates in well known manner to produce a D. C. control potential across the resistances 19 and 20 which is a sinusoidal function of any phase difference between the oscillations applied from the generator 1 and the reference source 16. The control potential is applied to the control electrode of a negative feedback amplifier comprising valve 23 via a condenser 24 and resistance 25. The anode of the valve is connected via a load resistance 26 to the positive terminal 27 of a D. C. potential source having its negative terminal connected to earth, and via potential dividing resistances 28 and 29 to the negative terminal 30 of a further potential source having its positive terminal earthed. Negative feedback potentials are applied from the junction of the resistances 28 and 29 via a resistance 31 to the control electrode of the valve 23 and a resistance 32 is connected between the cathode of said valve 23 and earth for biassing purposes. The junction of the resistances 25 and 31 is also a so-called "virtual earth" point, whose voltage excursion is very small. The potential set up at the junction of resistances 28 and 29 comprises a component proportional to the resultant potential at the upper end (in the drawing) of resistance 19 approximately in the ratio of the resistances 31 and 25, and a component proportional to the rate of change of said resultant potential (i. e., proportional to the rate of change of the phase difference between the oscillations from the generator 1 and the reference source 16), the proportionality factor being approximately the time constant of the resistance 31 with the condenser 24. The potential set up at the junction of the resistances 28 and 29 is applied to the input point 13 of the amplifier 12 via a resistance 33 and condenser 34, the latter condenser serving to add to the input a component proportional to the second differential of the potential at the upper end of the resistance 19. It is found in practice that this second differential is useful in improving the stability of the apparatus.

A further part of the input to the amplifier 12 comprises feedback potentials obtained from a potentiometer 35 connected between the terminals 36 of a suitable potential source, the movable contact of the potentiometer being connected through the armature of a tacho-generator 37 and through a resistance 38 and condenser 39, to the input point 13 of the amplifier 12. The tacho-generator 37 is driven from the shaft 7 and has its field winding 40 connected between the terminals 41 of a suitable steady D. C. source. The field of the generator may alternatively comprise a permanent magnet. The potential at the contact of the potentiometer 35 is proportional to the angular position of the shaft 7, and the tacho-generator serves to add to it a component proportional to the angular velocity of the shaft 7, this latter component serving to reduce the liability of the arrangement to oscillate due to lag in the motion of the shaft 7 arising from the inertia of the armature of the motor 8. The function of the condenser 39 is to allow feedback potential from the potentiometer 35 and tacho-generator 37, arising from any change in the angular position of the shaft 7, to be applied effectively instantaneously to the input point 13 of the amplifier 12. Said feedback potential is applied in negative phase with reference to the potential applied via the resistance 33 and condenser 34 to the input point 13 of the amplifier 12, so that the output of the amplifier is only a fraction of what otherwise it would be, said fraction being arranged to be sufficient to annul the acceleration of the petrol engine 2 which initiated the change in the angular position of the shaft 7. However, the feedback potential applied via the condenser 39 dies away during an interval, say of several seconds, determined by the time constant of the resistance 38 and the condenser 39. The output from the amplifier 12 thereupon increases and the throttle valve 4 is eventually moved to an equilibrium position in which the phase difference between the oscillations from the generator 1 and the source 16 is effectively zero.

The load on the generator 1 is illustrated diagrammatically as a resistance 42, but it will be understood that it may comprise television transmitting equipment or any other equipment which it is required to supply with the generated alternating current. The primary winding of a current transformer 43 is connected in series with the load 42, while a bridge rectifier of known kind indicated in general at 44, and a load resistance 45 are connected across the secondary winding of the transformer 43, the output of the bridge rectifier 44 being applied to a smoothing circuit comprising a resistance 46 and a condenser 47, and thence to the input of the amplifier 12 via a resistance 48 and the condenser 39. Variations of the D. C. potential across the smoothing circuit 46, 47, which may be called the load-control potential and is proportional to the current in the load 42 and therefore to the power output of the generator 1, are applied transiently, for an interval determined by the time constant of the resistance 48 and the condenser 39, to the input point 13 of the amplifier 12 in phase opposition to feedback potential from the potentiometer 35 and tacho-generator 37. Consequently when a sudden change in the load 42 occurs, a proportional variation in the load control potential occurs and is applied to the input point 13 of the amplifier 12 and causes the motor 8 to rotate rapidly to counteract the acceleration or deceleration of the petrol engine 2 arising from the sudden change in load, until the feedback potential just balances the load control potential. If the apparatus is properly adjusted the throttle valve 4 can be given the appropriate adjustment to modify the torque of the engine 2 to that required for the changed load with sufficient rapidity to prevent any substantial phase deviation becoming established in the output from the generator 1. This effect is illustrated in Figure 2 where two idealised graphs are shown in which the ordinates represent the phase difference between the oscillations from the generator 1 and the source 16 while the abscissae represent time, equal sudden increases of the load 42 occurring at time 0 in both cases. Graph a illustrates the behaviour of the circuit of Figure 1 as it would be in the absence of the means for deriving the load control potential and applying it to the amplifier 12, while graph b illustrates the behaviour of the circuit as illustrated. It will be observed from graph b that the load-control potential serves effectively to annul the transient phase shift arising from the sudden increase in load without the phase shift reaching any substantial amplitude, any small transient phase shift such as illustrated, due, for example, to inaccuracies in the adjustment of the circuit being soon reduced to zero by the action of the phase discriminator. It is possible in principle to reduce the transient phase shift to negligible proportions provided the natural hunting period of the apparatus is large compared with the response time of the throttle valve control to any change in the load 42.

The apparatus illustrated in Figure 1 also comprises a frequency discriminator which is provided for the purpose of reducing any frequency difference which may exist between the oscillations from the generator 1 and the oscillations from the source 16, on first starting the generator, to a sufficiently small value so that the phase discriminator can become effective to lock the two sets of oscillations closely in phase. It will be appreciated that if a considerable frequency difference exists between said two sets of oscillations the output from the phase discriminator would consist of an alternating potential having a frequency equal to said frequency difference but having a mean value of practically zero, so that it would have little controlling effect. The frequency discriminator is of the kind which comprises two counting circuits, one of said circuits comprising a switching valve 49, two condensers 50 and 51, and two rectifiers 52 and 53, the condenser 50 being connected to the anode of the valve 49 and to the terminal 54 of a positive potential source via a large resistance 55. The second counting circuit similarly comprises a switching valve 56, condensers 57 and 58, rectifiers 59 and 60 and resistance 61. Both the counting circuits are arranged to operate in the manner described in British patent specification No. 471,731, oscillations from the source 16 being applied to the control electrode of the valve 49 via a transformer 62 and resistance 63 for limiting grid current on positive half-cycles, so that the valve 49 is alternately rendered conducting and non-conducting and causes successive increments of charge to be acquired by the condenser 51 at a rate dependent upon the frequency of the oscillations from the generator 1. Oscillations are similarly applied from the generator 1 via a transformer 64 and resistance 65 to the control electrode of the valve 56 to cause successive increments of charge to be acquired by the condenser 58, at a rate dependent upon the frequency of the oscillations from the source 16. The charge increments acquired by the condenser 50 are equal to the corresponding charge increments acquired by the condenser 57, but it will be observed that the rectifiers 52 and 53 are connected in opposite senses to the rectifiers 59 and 60, and therefore, while the condenser 51 is charged positively the condenser 58 is charged negatively. The potential differences developed across the condensers 50 and 57 are added algebraically via resistances 66 and 67 across a smoothing condenser 68, so that any potential differences developed across the condenser 68 is effectively proportional to the difference in frequency between the oscillations from the generator 1 and the source 16, this potential being applied to the input point 13 of the amplifier 12 via a resistance 69. In some cases it may be preferred to disconnect the phase discriminator from the input point 13 of the amplifier when the frequency differences between the two sets of oscillations is considerable and to re-connect it when the frequency difference has been brought to a sufficiently small value by the frequency discriminator. This result may be achieved automatically by a relay 70 of any suitable kind connected to the output of the frequency discriminator. The relay 70 may be replaced by an electronic switching arrangement.

The invention has been described above with reference to an alternating current generator driven by a petrol engine and controlled in phase by comparison with oscillations derived from the public electricity supply, the generator being intended to operate television equipment. However, it will be appreciated that the invention may find general application to apparatus for generating oscillations which it is required to control in phase by comparison with reference oscillations. For example it may be applied to a generator driven by a D. C. motor supplied with power from accumulators, and the source of reference oscillations may be for example a crystal clock. The invention has many applications in a large broadcasting organization where a supply of considerable alternating current power at a standard frequency, independent of the public electricity supply, is required. The invention could also be applied to the frequency control generator of a national grid supply system.

In the form of the apparatus illustrated in Figure 1 disadvantages may arise in practice due to wear of the potentiometer 35 and Figure 3 illustrates a modification which can be effected in order to remove this disadvantage. Only parts of the apparatus are illustrated in Figure 3 and parts which are common to Figures 1 and 3 are indicated by the same reference numerals. It will also be understood that parts of Figure 3 not illustrated are the same as in Figure 1. The potentiometer 35 is omitted in Figure 3 and the output of the tacho-generator 37 is applied to an integrating circuit, which is preferably arranged as a so-called "Miller" integrating circuit as shown. The integrating circuit comprises a thermionic valve 71 (shown as a triode) and the output from the tacho-generator 37 is applied between the control electrode and the cathode of the valve 71 via a resistance 72 and a condenser 73. The anode of the valve 71 is connected to a source of positive potential 74 via a resistance 75 and to a source of negative potential 76 via resistances 77 and 78, the resistances 75, 77 and 78 being such that the mean direct current to the anode of the valve 71 is substantially zero and that the junction of the resistances 77 and 78 is substantially at earth potential. The junction of the resistances 77 and 78 is connected to the control electrode of the valve 71 via a condenser 79 and a resistance 80 and is also connected through a resistance 81 to the input point 13 of the amplifier 12. When the position of the throttle 6 is altered by means of the motor 8 the tacho-generator 37 feeds to the integrating circuit a potential proportional to the rate of rotation of the shaft 7. A potential representing the integral of the tacho-generator output with respect to time is therefore set up across the condenser 79 and is applied to the amplifier 12, this latter potential being equivalent to the potential derived from the potentiometer 35 in Figure 1. The condenser 73 serves to add to the integrated potential set up across the condenser 79 a component directly proportional to the tacho-generator output so that the potential set up across the condenser 79 is fully equivalent to that derived from the potentiometer 35 and tacho-generator 37 in Figure 1. It will be observed that the path from the condenser 79 to the input point 13 of the amplifier 12 does not include the condenser 39, a resistance 80 being provided in shunt with the condenser 79 to allow the feedback potential from the condenser 79 to decay in a time dependent upon the time constant of 79 and 80. The condenser 39 is, however, still disposed between the resistance 48 and the input point 13.

What I claim is:

1. Apparatus for controlling the phase of an electrical oscillation generator driven by a source of mechanical power, said apparatus including means for comparing the phase of the generated alternating current with the phase of reference oscillations, means for controlling the phase of the generated alternating current in dependence upon said comparison, means for developing a control signal dependent on the load on said generator, and means responsive to said control signal for controlling transiently the power developed by said source in proportion to variations in the load on said generator to reduce transient phase deviations of the generated alternating current which would otherwise result from a variation in the load presented by said generator to said source.

2. Apparatus for controlling the phase of a rotary alternating current generator driven by a prime mover, said apparatus including means for comparing the phase of the generated alternating current with the phase of reference oscillations, means for controlling the torque of said prime mover in dependence upon said comparison to annul substantially phase deviations of the generated alternating current relative to the phase of the reference oscillations, means for deriving a control signal dependent on the instantaneous amplitude of the generated alternating current, and means including a time constant circuit and responsive to said control signal for controlling transiently the torque of said prime mover in proportion to variation in the amplitude of the generated alternating current to reduce transient phase deviations of the generated alternating current which would otherwise result from variations in the load presented by said generator to said prime mover.

3. Apparatus for controlling the phase of an electro-mechanical alternating current generator driven by a source of mechanical power, said apparatus including means for comparing the phase of the generated alternating current with the phase of reference oscillations and for generating a control potential representative of the difference of the compared phases, means for applying part of said control potential instantaneously to arrest phase deviation of the generated alternating current with respect to the phase of the reference oscillations and for applying the whole of said control potential subsequently to effectively annul said phase deviation, means for generating a further control potential dependent upon variations in the amplitude of the current output from said generator, and means for applying said further control potential transiently to control the power output of said source in proportion to any variation of said amplitude to reduce transient phase deviation of the generated alternating current which would otherwise result from a variation in the load presented by said generator to said source.

4. The combination according to claim 3 wherein the means for generating said further control potential comprises a current transformer having a primary winding included in the output circuit of said generator, and a rectifier connected to a secondary winding of said transformer for rectifying the potential variations set up across said secondary winding, said means for applying said further control potential transiently including a time constant circuit, whereby said further control potential is instantaneously applied and thereupon progressively reduced.

5. Apparatus for controlling the phase of an electro-mechanical alternating current generator driven by a source of mechanical power and having mechanical control means to control the power output of said source, said apparatus including means for comparing the phase of the generated alternating current with the phase of reference oscillations and for generating a control potential representative of the difference in the compared phases, a thermionic valve amplifier for amplifying said control potential, means for operation by the output of said amplifier to displace said control means to reduce the power output of said source in a sense to reduce the output of said amplifier, means for deriving a feedback potential representative of the displacement of said control means, a time constant circuit for transiently applying said feedback potential to the input of said amplifier to balance out part of said control potential, whereby part of said control potential is at first effective to arrest phase deviation of the generated alternating current with respect to the phase of the reference oscillations and subsequently the whole of said control potential is effective to substantially annul said phase deviation, and means for generating a further control potential dependent upon variations in the amplitude of the current output from said generator and for applying transiently said further control potential to the input of said amplifier to reduce the effect of said feedback potential for phase deviation due to variation in the load presented by said current generator to said source.

6. The combination according to claim 5 comprising means for generating a potential representative of the rate of change of said control potential, and means for adding said last-mentioned potential to said control potential at a point prior to said amplifier.

7. The combination according to claim 5 comprising means for generating a potential representative of the rate of change of said feedback potential and for adding said last-mentioned potential to said feedback potential at a point prior to said time constant circuit.

8. Apparatus for controlling the phase of an electro-mechanical alternating current generator driven by a source of mechanical power and having control means for controlling the power output of said source, said apparatus including means for comparing the phase of the generated alternating current with the phase of reference oscillations and for deriving a control potential representative of the difference in the compared phases, a thermionic valve amplifier for amplifying said control potential, electro-mechanical means for operation by the output of said amplifier and arranged to adjust the setting of said control means to control the power output of said source in a sense to reduce the output of said amplifier, a tacho-generator driven by said electro-mechanical means for setting up an output potential representative of the rate of change of the setting of said control means, means for integrating part of the output potential of said tacho-generator to set up a potential representative of changes in the setting of said control means, means for adding said last-mentioned potential to another part of the output potential of said tacho-generator, and a time constant circuit for transiently applying the added potentials to the input of said amplifier to balance out temporarily part of said control potential, whereby part of said control potential is effective to arrest phase deviation of the generated alternating current with respect to the phase of the reference oscillations and subsequently the whole of said control potential is effective to substantially annul said phase deviation.

9. The combination according to claim 8 wherein said integrating means comprises a thermionic valve having at least an anode, a control electrode and a cathode, an integrating capacity coupling said anode to said control electrode to provide negative feedback, and means coupling the output of said tacho-generator to the control electrode of said valve.

10. The combination according to claim 8 comprising means for generating a further control potential dependent upon variations in the amplitude of the generated alternating current and for applying said further control potential transiently to the input of said amplifier to reduce transient phase deviation of the generated alternating current which would otherwise result from a variation of the load presented by said first-mentioned generator to said source.

11. Apparatus for controlling the phase of an alternating current generator, said apparatus including a phase discriminator for comparing the phase of the generated alternating current with the phase of reference oscillations and for generating a control potential dependent upon the difference in the compared phases, a frequency discriminator for comparing the frequency of the generated oscillations with the frequency of said reference oscillations and for generating a further control potential dependent upon the difference in the compared frequencies, a control device responsive to said first control potential when the further control potential does not exceed a predetermined value and responsive to said further control potential but unresponsive to said first control potential when the further control potential exceeds said value, said control device being arranged to control said generator to reduce the control potential to which the control device is responsive.

12. The combination according to claim 11 wherein said frequency discriminator comprises electrical means for counting the cycles of the generated alternating current, electrical means for counting the cycles of the reference oscillations, and means for differentially combining voltages representative of the rates of counting the respective cycles.

13. The combination according to claim 11, and means for transiently controlling the power output of a source of mechanical power for driving said generator in proportion to the load variations on said generator to reduce transient phase deviation of the generated oscillations due to variation of said load.

ERIC LAWRENCE CASLING WHITE.

REFERENCES CITED

The following references are of record in the file of this patent:

UNITED STATES PATENTS

| Number | Name | Date |
|---|---|---|
| 1,211,802 | Woodbridge | Jan. 9, 1917 |
| 1,525,686 | Osnos | Feb. 10, 1925 |
| 1,647,192 | Nyquist | Nov. 1, 1927 |
| 2,044,749 | Usselman | June 16, 1936 |
| 2,195,116 | Modlinger | Mar. 26, 1940 |
| 2,233,604 | Gulliksen | Mar. 4, 1941 |
| 2,367,975 | Sullivan | Jan. 23, 1945 |
| 2,419,637 | Gabriel et al. | Apr. 29, 1947 |